(12) United States Patent
Ryham

(10) Patent No.: US 6,261,412 B1
(45) Date of Patent: Jul. 17, 2001

(54) REGENERATIVE HEAT RECOVERY FOR HIGH TEMPERATURE CONDENSATE STRIPPING PLANTS

(75) Inventor: Rolf C. Ryham, Suwanee, GA (US)

(73) Assignee: Andritz-Ahlstrom Inc., Glens Falls, NY (US)

( * ) Notice: Subject to any disclaimer, the term of this patent is extended or adjusted under 35 U.S.C. 154(b) by 0 days.

(21) Appl. No.: 09/426,585

(22) Filed: Oct. 25, 1999

Related U.S. Application Data

(60) Provisional application No. 60/105,585, filed on Oct. 26, 1998.

(51) Int. Cl.[7] .............................. D21C 11/06; B01D 3/34
(52) U.S. Cl. ................................ 162/17; 162/29; 162/51; 159/47.3; 203/22; 203/27; 203/92
(58) Field of Search .................................. 162/16, 29, 51; 159/47.3; 203/92, 22, 27

(56) References Cited

U.S. PATENT DOCUMENTS

| | | | |
|---|---|---|---|
| 5,450,892 | * | 9/1995 | Gautreaux, Jr. .......................... 162/16 |
| 6,030,494 | * | 2/2000 | Hupa et al. .............................. 162/51 |

OTHER PUBLICATIONS

Pu, Q. et al, "Steam Stripping of Kraft Foul Condensates to Reduce TRS and BOD", 1994 International Environ. Conf., Proceedigs, pp. 863–872.

Burgess, T., "The Basics of Kfoul Condensate Stripping", Tappi Kraft Recovery Short Course 1996, pp. 4.1–1–4.1–32.

* cited by examiner

Primary Examiner—Dean T. Nguyen
(74) Attorney, Agent, or Firm—Nixon & Vanderhye P.C.

(57) ABSTRACT

The EPA Cluster Rules for cellulose pulp mills are complied with by first collecting foul condensate including hazardous air pollutants (HAPs), such as methanol, at a temperature of between about 140–180° F., and passing the foul condensate into direct contact with heated vapor at a plurality of series connected stations to gradually heat the foul condensate to a temperature desirable for steam stripping. Then the heated foul condensate is steam stripped to produce a high temperature (e.g. about 250–350° F., preferably about 300°) clean condensate. Then the high temperature clean condensate is flashed in a plurality of flash stations to produce a heated vapor in a lower temperature clean condensate, and the heated vapor is used to heat the foul condensate in each of the direct contact heat exchangers. Typically the highest temperature is used to heat the highest temperature foul condensate, with progressively lower temperature vapors used to heat progressively lower temperature condensate stations. A vapor is produced during steam stripping, and using low pressure steam the vapor is reboiled to produce a discharge containing the majority of HAPs, and the HAPs in the discharge are destroyed in a conventional thermal destruct unit or in another conventional manner.

12 Claims, 1 Drawing Sheet

US 6,261,412 B1

REGENERATIVE HEAT RECOVERY FOR HIGH TEMPERATURE CONDENSATE STRIPPING PLANTS

CROSS REFERENCE TO RELATED APPLICATION

This application is based upon provisional application Ser. No. 60/105,585 filed Oct. 26, 1998, the disclosure of which is hereby incorporated by reference herein.

BACKGROUND AND SUMMARY OF THE INVENTION

In the United States, the Environmental Protection Agency (EPA) has promulgated Cluster Rules for cellulose pulp mills, and like mills. The Cluster Rules basically say that a cellulose pulp mill (e.g. kraft mill) has to collect streams of condensate resulting from the pulping operation containing at least 65% of the HAPs ("Hazardous Air Pollutants", defined by the EPA as MeOH (methanol), which is a surrogate for real HAPs which often includes more than 50 different kinds of components) and to treat these condensates so that 92% of this HAP (MeOH) is removed and destroyed by thermal oxidation (in a conventional thermal destruct unit). In order to comply with EPA Cluster Rules in the United States, cellulose pulp mills, including kraft pulp mills, have taken three basic approaches associated with condensate handling and heat recovery.

The first approach is to use hard piping. This segregates a specific quantity of process condensate containing HAPs and disposes of them into a defined and process specific aeration zone in a wastewater treatment plant of the mill. This approach is inexpensive, but does not typically allow optimum heat recovery.

The second approach is to recirculate process condensates. This concept attempts zero discharge, but is difficult to understand, and has not likely ever been successfully implemented.

The third general approach—to which the invention is directed—is to collect a specific quantity of process condensates, including containing HAPs, and to steam strip the condensates. One of the biggest problems associated with this general approach is what to do with the energy used, and coming out of the process. Preferably this energy can be integrated into existing process areas, such as evaporators or the like. However, this integration is very costly.

Another solution to the "what to do with the energy" problem is to use a pre-evaporator combined with a steam stripper using vapor compression technology, thus eliminating the need for energy integration. Another approach is to also make the stripper integration between two different steam pressures (e.g. 150–50 psig), thus enabling the recovery of practically all of the energy from one level to another. This can be a very efficient alternative, providing that the steam is not used in a back-pressure steam turbine. However, a significant drawback of both of these solutions is the system operating temperature (typically between about 260–320 degrees F.) compared to the temperature of the condensates being stripped (typically between about 200–220 degrees F.). This requires heating of the incoming foul condensate while cooling the outgoing stripped condensate, necessitating the use of very large multi-pass multiple indirect heat exchangers. The costs of these indirect heat exchangers can sometimes exceed the cost of the stripper column, and the indirect heat exchangers are sensitive to fouling of the heating surfaces thereof.

According to the present invention, the third general approach set forth above is utilized, but at a fraction of the cost of an indirect heat exchanger system, and in such a way that the system is totally insensitive to scale formation or pluggage due to impurities in the condensate.

According to one aspect of the present invention a method of treating foul condensate is provided comprising: (a) collecting foul condensate containing Hazardous Air Pollutants (HAPs) in a pulp mill; the foul condensate having a temperature of between about 140–180 degrees F.; (b) passing the foul condensate into direct contact with heated vapor at a plurality of series connected stations to gradually heat the foul condensate to a temperature desirable for steam stripping; (c) steam stripping the heated foul condensate to produce a high temperature clean condensate; (d) flashing the high temperature (e.g. about 250–350° F., e.g. about 300° F.) clean condensate in a plurality of flash stations to produce a heated vapor and a lowered temperature clean condensate; and (e) using the heated vapors from (d) to heat the foul condensate in each of the stations from (b).

Preferably (b) and (e) are practiced to provide the highest temperature vapor from (e) to the highest temperature foul condensate from (b), with progressively lower temperature vapors from (e) used for progressively lower temperature condensate stations from (b). Also, preferably (b) and (e) are each practiced at between two-ten stations, and preferably the same number of stations are utilized during the practice of each of (b), (d), and (e). Preferably high pressure steam (e.g. 130–200 psig) is provided for stripping, and the vapor from stripping is reboiled, producing lower pressure (e.g. 30–100 psig) steam. The temperature of the clean condensate discharged from (e) is preferably between about 190–210 degrees F.

Also, under normal circumstances (c) is practiced using steam at a pressure of about 130–200 psig (e.g. about 150 psig). The method may further comprise (f) producing a vapor during (c), and (g) using steam at a pressure of about 30–100 psig (e.g. about 50 psig) to reboil the vapor from (c). In the method (g) may be practiced to produce a discharge containing the majority of HAPs, and there may be the further procedure of (h) destroying the HAPs in the discharge (typically by thermal destruction in a conventional thermal unit).

According to another aspect of the invention a foul condensate treatment and heat recovery system is provided comprising: a plurality of series connected direct contact condensers including a first condenser connected to a pump and a source of foul condensate, and a last condenser; a steam stripper connected to the last condenser; a clean condensate discharge line extending from the steam stripper; a plurality of series connected flash tanks connected to the clean condensate discharge line, and including a first flash tank operatively closest to the steam stripper and receiving the highest temperature input clean condensate, and a last flash tank, each flash tank having a flashed vapor outlet; and the first flash tank vapor outlet operatively connected to the last condenser to heat the foul condensate therein, and the last flash tank vapor outlet connected to the first condenser to heat the foul condensate therein. Any intermediate flash tanks and condensers are connected to each other so that the respective vapor temperatures of the vapor outlets are matched with (connected to) comparable temperature condensers. The vapor outlet from the stripper is preferably connected to a reboiler.

The system typically includes at least one intermediate flash tank and condenser, and may further comprise a reboiler. The vapor outlet from the stripper may be connected to the reboiler. Also, the system may comprise a HAPs thermal destruct unit, and the boiler may comprise a discharge connected to the thermal destruct unit. A pump is typically provided between each of the condensers.

It is the primary object of the present invention to provide an efficient and effective method and system for complying with the Cluster Rules. This and other objects of the invention will become clear from a detailed inspection of the invention and from the appended claims.

DETAILED DESCRIPTION OF THE DRAWING

Figure 1:
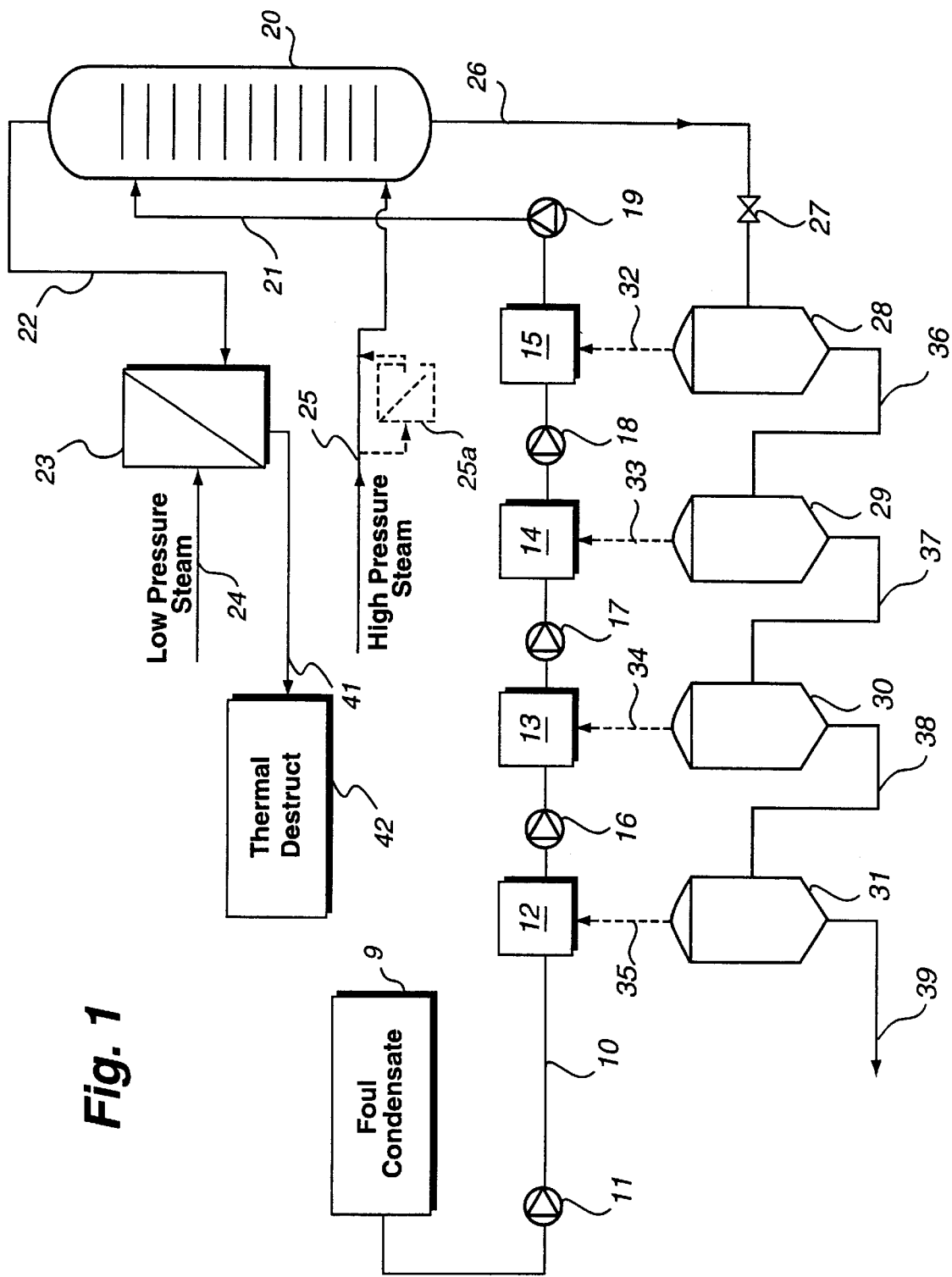
FIG. 1 is a schematic illustration of an exemplary system according to the invention for practicing an exemplary method according to the present invention.

An exemplary system, for practicing an exemplary method, according to the present invention is schematically illustrated in FIG. 1 of the drawings.

In FIG. 1, foul condensate (containing HAPs)—which is collected in any suitable manner from any foul condensate source of a mill, such as a cellulose pulp mill (e.g. kraft mill)—is indicated generally by reference numeral 9, and flows in line 10, such as powered by a first pump 11. The foul condensate in line 10 is typically at a temperature of between about 140–180 degrees F., e.g. about 160° F. and flows through a plurality of series connected conventional direct contact condensers 12–15 (or like conventional structures for performing the same function). While four such condensers 12–15 are schematically illustrated in FIG. 1, it is understood that any number between one, or two, and about ten can be provided (or any other narrow range within these broad ranges). Typically, although not necessarily, a pump 16–19 is provided after each condenser 12–15, respectively.

The last condenser 15 in the series is connected to a conventional steam stripper 20 via the conduit 21 leading to a position adjacent the top of the stripper 20. The vapor from the stripper 20, which includes the vast majority of the HAPs (MeOH) passes out line 22 at the top of the stripper 20 to a conventional reboiler 23, fed with relatively low pressure (e.g. 35–100 psig) steam via line 24. The discharge from the reboiler 23 is handled as is conventional, e.g. ultimately sent via line 41 to a conventional thermal destruct unit 42 or other effective device for destroying the HAPs. Relatively high pressure steam (e.g. 115–200 psig such as about 150 psig) is fed by line 25 into the stripper column 20 adjacent the bottom thereof to effect steam stripping. Alternatively or in addition, as shown in dotted line at 25a in FIG. 1, steam can be supplied from a reboiler The clean condensate from the stripper 20 passes in line 26, typically through a valve 27 (such as a conventional check valve, flow control valve, or on/off valve), to a multi-flash system for simultaneously lowering the temperature of the clean condensate 26 and providing heating fluid for heating the foul condensate 10 before being fed into the stripper 20. The multi-flash system preferably comprises or consists essentially of a series of a plurality of flash tanks 28–31 (or like conventional structures performing the same function).

Typically one flash tank 28–31 is associated with each condenser 12–15. In the exemplary embodiment illustrated in FIG. 1, where the foul condensate 10 has a temperature of about 160 degrees F., and the clean condensate 26 a temperature of about 300 degrees F., the temperature of the clean condensate 26 is reduced to about 190 degrees F. in a series of four flash tanks 28–31, each connected to an associated condenser 12–15. The flash tank 28, which has a vapor in line 32 from the top thereof which is the highest temperature of the flash tank vapors, is connected to the last, highest temperature, condenser 15, while the vapor lines 33–35 from the flash tanks 29–31, respectively, are connected to the other condensers 14–12, respectively, having comparable positions in their respective series, as schematically illustrated in FIG. 1.

The liquid from the bottom of each of the flash tank 28–30 is passed to the next flash tank via lines 36–39, respectively, while the last line 39 passes the lowered temperature (e.g. to about 190 degrees F.) clean condensate to any conventional desired use thereof within the mill. The exemplary temperature of the condensate after each flash tank 28–31, and the corresponding temperature of the foul condensate 10 after each condenser 12–15, for a foul condensate 10 at about 160 degrees F., and clean condensate 26 at about 300 degrees F. for FIG. 1 is: the temperature in line 36 after the fourth flash tank 28 is about 272° F., the temperature in the line 37 after the third flash tank 29 is about 245° F., and the temperature in line 38 after the second flash tank 30 is about 217° F., and the temperature in the line 39 after the first flash tank 31 is about 190° F. The foul condensate of about 160° F. is heated in the direct heat exchangers 12–15 so that it is raised incrementally in each of the heat exchangers, the hottest heating fluid (from line 32) being provided in the last heat exchanger 15. For example, the temperature of the foul condensate at the pump 16 is about 190° F., the temperature at the pump 17 is about 217° F., the temperature at the pump 18 is about 245° F., and the temperature at the pump 19 is about 272° F. For each degree increase in the temperature of the foul condensate 10 an approximate one degree increase in each of the other temperatures indicated above with respect to FIG. 1 also occurs.

An exemplary method according to the invention comprises: (a) collecting foul condensate (10) containing HAPs in a pulp mill; the foul condensate having a temperature of between about 140–180 degrees F.; (b) passing the foul condensate (e.g. via 11 and 16–18) into direct contact with heated vapor at a plurality of series connected stations (e.g. 12–15) to gradually heat the foul condensate to a temperature desirable for steam stripping; (c) steam stripping the heated foul condensate to produce a high temperature (e.g. about 250–350° F.) preferably clean condensate; (d) flashing the high temperature clean condensate in a plurality of flash stations (e.g. 28–31) to produce a heated vapor and a lowered temperature clean condensate; and (e) using the heated vapors from (d) to heat the foul condensate in each of the stations from (b). Preferably (b) and (e) are practiced to provide the highest temperature vapor from (e) to the highest temperature foul condensate from (b), with progressively lower temperature vapors from (e) used for progressively lower temperature condensate stations from (b). Also, preferably (b) and (e) are each practiced at between two-ten stations, and preferably the same number of stations are utilized during the practice of each of (b), (d), and (e). Preferably high pressure steam (e.g. 130–200 psig) is provided for stripping, and the vapor from stripping is reboiled, using lower pressure (e.g. 30–100 psig) steam. The temperature of the clean condensate discharged from (e) is preferably between about 190–210 degrees F.

According to another aspect of the invention a foul condensate treatment and heat recovery system is provided comprising: a plurality of series connected direct contact condensers (12–15) including a first condenser (12) connected to a pump (11) and a source of foul condensate (10), and a last condenser (15); a steam stripper (20) connected to the last condenser; a clean condensate discharge line (26) extending from the steam stripper; a plurality of series connected flash tanks (28–31) connected to the clean condensate discharge line, and including a first flash tank (28) operatively closest to the steam stripper and receiving the highest temperature input clean condensate, and a last flash tank (31), each flash tank having a flashed vapor outlet (32–35); and the first flash tank vapor outlet (32) operatively connected to the last condenser (15) to heat the foul condensate therein, and the last flash tank vapor outlet (35) connected to the first condenser (12) to heat the foul condensate therein. Any intermediate flash tanks and condensers are connected to each other so that the respective vapor temperatures of the vapor outlets are matched with (connected to) comparable temperature condensers. The vapor outlet (22) from the stripper is preferably connected to a reboiler (23).

Thus in accordance with the invention, the purified condensate is flash cooled while the incoming foul condensate is heated in a manner that is totally insensitive to scale formation or pluggage due to foul condensate impurities. The units 12–15 and 28–31 are inexpensive compared to most evaporators, indirect heat exchangers, and the like, yet are extremely effective in achieving compliance with the EPA Cluster Rules by pulp mills or the like. Many modifications may be provided, including using one or more condensers or flash tanks connected in parallel with the other condensers or flash tanks which can be used when a given flash tank or condenser is down for repair or maintenance. All narrower ranges within any broad range given above may also be utilized.

The invention is to be accorded the broadest interpretation of the appended claims so as to encompass all equivalent methods and systems.

What is claimed is:

1. A method of treating foul condensate comprising:
   (a) collecting foul condensate containing Hazardous Air Pollutants (HAPS) in a pulp mill; the foul condensate having a temperature of between about 140–180 degrees F.;
   (b) passing the foul condensate into direct contact with heated vapor at a plurality of series connected stations to gradually heat the foul condensate to a temperature desirable for steam stripping;
   (c) steam stripping the heated foul condensate to produce a high temperature clean condensate;
   (d) flashing the high temperature clean condensate in a plurality of flash stations to produce a heated vapor and a lowered temperature clean condensate; and
   (e) using the heated vapors from (d) to heat the foul condensate in each of the stations from (b).

2. A method as recited in claim 1 wherein (b) and (e) are practiced to provide the highest temperature vapor from (e) to the highest temperature foul condensate from (b), with progressively lower temperature vapors from (e) being used for progressively lower temperature condensate stations from (b).

3. A method as recited in claim 2 further comprising (f) producing a vapor while steam stripping the heated foul condensate according to (c); (g) reboiling the vapor from (c) to produce a discharge containing the majority of HAPs, and (h) destroying the HAPs in the discharge; wherein (h) is practiced by thermal destruction to comply with the EPA Cluster Rules for the mill.

4. A method as recited in claim 1 wherein (b) and (e) are each practiced at between four-ten stations, and substantially the same number of stations are utilized during the practice of each of (b), (d), and (e).

5. A method as recited in claim 1 wherein (c) is practiced using steam at a pressure between about 130–200 psig.

6. A method as recited in claim 1 comprising: (f) producing a vapor while steam stripping the heated foul condensate according to (c); and (g) using steam at a pressure of about 30–100 psig to reboil the vapor produced from (c).

7. A method as recited in claim 6 further comprising practicing (g) to produce a discharge containing the majority of HAPs, and (h) destroying the HAPs in the discharge.

8. A method as recited in claim 7 wherein (h) is practiced by thermal destruction.

9. A method as recited in claim 1 wherein (a)–(e) are practiced so that the temperature of the clean condensate discharged from (e) is between about 190–210° F.

10. A method as recited in claim 1 comprising (f) producing a vapor while steam stripping the heated foul condensate according to (c); and (g) reboiling the vapor produced from (c).

11. A method as recited in claim 10 further comprising practicing (g) to produce a discharge containing the majority of HAPs, and (b) destroying the HAPs in the discharge.

12. A method as recited in claim 11 wherein (h) is practiced by thermal destruction.

* * * * *